United States Patent
Arney et al.

(10) Patent No.: US 7,101,616 B2
(45) Date of Patent: Sep. 5, 2006

(54) SMUDGE RESISTANT NANOCOMPOSITE HARDCOATS AND METHODS FOR MAKING SAME

(75) Inventors: David S. Arney, St. Paul, MN (US); Judith M. Invie, Woodbury, MN (US); Alexander B. Doust, Toronto (CA)

(73) Assignee: 3M Innovative Properties Company, St. Paul, MN (US)

( * ) Notice: Subject to any disclaimer, the term of this patent is extended or adjusted under 35 U.S.C. 154(b) by 264 days.

(21) Appl. No.: 10/236,737

(22) Filed: Sep. 6, 2002

(65) Prior Publication Data

US 2003/0068486 A1 Apr. 10, 2003

Related U.S. Application Data

(63) Continuation-in-part of application No. 09/952,135, filed on Sep. 11, 2001, now abandoned.

(51) Int. Cl.
B32B 5/16 (2006.01)
B27N 3/02 (2006.01)

(52) U.S. Cl. .................... 428/323; 428/325; 428/328; 428/329; 428/407; 264/109; 264/112; 264/113

(58) Field of Classification Search ............... 428/323, 428/325, 328–329, 332, 336, 402, 406, 407; 264/109, 112–113, 123
See application file for complete search history.

(56) References Cited

U.S. PATENT DOCUMENTS

| | | | |
|---|---|---|---|
| 2,801,185 A | 7/1957 | Iler | |
| 3,950,588 A | 4/1976 | McDougal | |
| 4,188,246 A | 2/1980 | Lipshaw | |
| 4,522,958 A | 6/1985 | Das et al. | |
| 4,907,090 A | 3/1990 | Ananian | |
| 5,002,326 A | 3/1991 | Westfield et al. | |
| 5,104,929 A | 4/1992 | Bilkadi | |
| 5,220,047 A | 6/1993 | Pohl et al. | |
| 5,252,743 A | 10/1993 | Barrett et al. | |
| 5,322,873 A * | 6/1994 | Pohl et al. | 524/188 |
| 5,389,438 A | 2/1995 | Miller et al. | |
| 5,451,683 A | 9/1995 | Barrett et al. | |
| 5,482,867 A | 1/1996 | Barrett et al. | |
| 5,488,142 A | 1/1996 | Fall et al. | |
| RE35,318 E | 8/1996 | Warman | |
| 5,648,407 A | 7/1997 | Goetz et al. | |
| 5,670,598 A | 9/1997 | Leir et al. | |
| 5,846,650 A | 12/1998 | Ko et al. | |
| 5,851,664 A | 12/1998 | Bennett et al. | |
| 5,851,674 A | 12/1998 | Pellerite et al. | |

(Continued)

FOREIGN PATENT DOCUMENTS

DE 36 37 188 A1 5/1988

(Continued)

OTHER PUBLICATIONS

Yamaguchi et al., "Novel Silane Coupling Agents Containing a Photolabile 2-Nitrobenzyl Ester for Introduction of a Carboxy Group on the Surface of Silica Gel", The Chemical Society of Japan, Chemistry Letters (2000), pp. 228-229.

(Continued)

Primary Examiner—Holly Rickman (57) ABSTRACT

Nanocomposite hardcoats having smudge and abrasion resistant properties are disclosed. Latent reactive nanoparticles are contained within a binder phase to form a nanocomposite. When deprotected and treated with a reactive fluorochemical, nanoparticles present at the surface of the nanocomposite become permanently modified and impart smudge resistance. The nanocomposite hardcoats may optionally be supported on a primary substrate.

67 Claims, 2 Drawing Sheets

U.S. PATENT DOCUMENTS

| | | | |
|---|---|---|---|
| 5,888,290 A | 3/1999 | Engle et al. | |
| 5,998,504 A | 12/1999 | Groth et al. | |
| 6,004,670 A | 12/1999 | Kobe et al. | |
| 6,020,419 A | 2/2000 | Bock et al. | |
| 6,059,628 A | 5/2000 | Yoo et al. | |
| 6,099,682 A | 8/2000 | Krampe et al. | |
| 6,121,143 A | 9/2000 | Messner et al. | |
| 6,132,861 A | 10/2000 | Kang et al. | |
| 6,136,939 A | 10/2000 | Mager et al. | |
| 6,160,067 A | 12/2000 | Eriyama et al. | |
| 6,238,798 B1 * | 5/2001 | Kang et al. | 428/421 |
| 6,245,833 B1 | 6/2001 | Kang et al. | |
| 6,250,765 B1 | 6/2001 | Murakami | |
| 6,261,700 B1 * | 7/2001 | Olson et al. | 428/522 |
| 6,329,058 B1 * | 12/2001 | Arney et al. | 428/403 |
| 6,329,059 B1 | 12/2001 | Karchevsky et al. | |
| 6,485,789 B1 | 11/2002 | Allewaert et al. | |

FOREIGN PATENT DOCUMENTS

| | | |
|---|---|---|
| DE | 197 46 885 A1 | 10/1997 |
| DE | 198 45 496 A1 | 10/1998 |
| DE | 198 57 317 A1 | 12/1998 |
| DE | 197 46 885 A1 | 6/1999 |
| DE | 199 52 040 A1 | 10/1999 |
| DE | 198 57 317 A1 | 6/2000 |
| DE | 199 52 040 A1 | 5/2001 |
| EP | 0 476 564 B1 | 12/1995 |
| EP | 0 832 947 A2 | 4/1998 |
| JP | 2000-20240 | 1/2000 |
| WO | WO 95/27012 | 10/1995 |
| WO | WO99/37720 * | 7/1999 |
| WO | WO 99/37720 | 7/1999 |
| WO | WO 99/38034 | 7/1999 |
| WO | WO 99/53357 | 10/1999 |
| WO | WO 99/57185 | 11/1999 |
| WO | WO 99/57205 | 11/1999 |
| WO | WO 00/24576 | 5/2000 |
| WO | WO 00/74074 A1 | 12/2000 |
| WO | WO 01/05897 A1 | 1/2001 |
| WO | WO 01/30307 A1 | 5/2001 |

OTHER PUBLICATIONS

U.S. Appl. No. 09/633,835, filed Aug. 7, 2000, Microscope Cover Slip Materials.

U.S. Appl. No. 09/923,749, filed Aug. 7, 2001, Antisoiling Hardcoat.

U.S. Appl. No. 09/924,127, filed Aug. 7, 2001, Information Display Protectors.

U.S. Appl. No. 09/756,303, filed Jan. 8, 2001, Energy Curable Inks and Other Compositions Incorporating Surface Modified, Nanometer-Sized Particles.

* cited by examiner

SMUDGE RESISTANT NANOCOMPOSITE HARDCOATS AND METHODS FOR MAKING SAME

CROSS-REFERENCE TO RELATED APPLICATION

This application is a continuation-in-part of U.S. application Ser. No. 09/952,135, filed Sep. 11, 2001, now abandoned.

FIELD OF THE INVENTION

The invention relates to the field of protective coatings and methods for making same. In particular, the invention relates to smudge resistant hardcoats containing nanoparticles.

BACKGROUND OF THE INVENTION

Many thermoplastic and thermosetting polymers have excellent rigidity, dimensional stability, transparency, and impact resistance, but unfortunately have poor abrasion resistance. Consequently, structures formed from these materials are susceptible to scratches, abrasion, and similar damage. To protect these structures from physical damage, a tough, abrasion resistant "hardcoat" layer may be coated onto the structure. Such coatings are desirably transparent and are typically present as very thin coatings.

In addition to abrasion resistance, it is often desirable that the hardcoat provide resistance to marking and/or easy removal (i.e., smudge resistance), by fingerprints, markers, spray paint, and the like. Smudge resistant nanocomposite hardcoats are of particular interest for optical display applications requiring the protection of a plastic substrate from marring or scratching while also providing an easily cleaned surface.

One of the most effective technical approaches to hardcoat materials has been to incorporate inorganic nanometer scale particles into a binder precursor resin matrix. The surface of the particles may be functionalized with a variety of coupling agents to improve compatibility with and/or bonding to the binder resin to improve the abrasion resistance of the hardcoat.

Approaches to smudge resistant nanocomposite hardcoats have included the incorporation of fluorinated organosilane coupling agents, fluorinated monomers, and/or fluorinated surfactants into the formulations. In each case, the fluorinated material is incorporated into the bulk of hardcoat construction. Fluorinated materials that are not situated on the nanocomposite hardcoat's exposed outer surface do not provide effective smudge resistant properties, and may have a deleterious effect on abrasion resistance, adhesion of the hardcoat to the substrate, and add unnecessary cost to the hardcoat formulation. In addition, fluorinated materials that are not covalently bound to the nanocomposite hardcoat may be removed during washing and their smudge resistance degraded.

Similarly, a fluorinated organosilane coating applied to the surface of a hardcoat may not effectively bond to the hardcoat, and lose smudge resistance upon repeated chemical or mechanical insult to the coating due to a lack of covalent bonding between the smudge resistant layer and the hardcoat layer. Thus, there exists a need for nanocomposite hardcoat constructions having improved durability of smudge resistance.

SUMMARY OF THE INVENTION

The present invention relates to smudge and abrasion resistant protective coatings, methods for their preparation and articles employing them. The present invention provides nanocomposite hardcoats having exposed reactive groups that can covalently attach smudge resistant moieties to the surface of the hardcoat. The invention is typically achieved by combining a binder precursor and surface modified nanoparticles, wherein nanoparticles have been surface modified with a latent coupling agent. After curing the binder precursor, the latent coupling agent can be deprotected at the surface of the coating, or throughout the bulk, to form nanoparticles having organic reactive groups covalently bonded thereto. Subsequently, the organic reactive groups can be treated with a reactive fluorochemical to provide smudge resistant nanocomposite hardcoats.

In one aspect, the invention provides a method for preparing a smudge and abrasion resistant article comprising the steps of:
 a) contacting a plurality of nanoparticles with a latent coupling agent to form latent reactive nanoparticles;
 b) intimately mixing the latent reactive nanoparticles with a binder precursor;
 c) curing the binder precursor to form a nanocomposite having an exposed first surface comprising latent reactive nanoparticles;
 d) deprotecting a plurality of latent reactive nanoparticles to form reactive nanoparticles at the first surface of the nanocomposite; and
 e) contacting a reactive fluorochemical with the first surface of the nanocomposite such that fluorinated organic groups are covalently bonded to a plurality of the reactive nanoparticles present at the first surface of the nanocomposite.

In one embodiment, the method further comprises the additional step of coating the mixture of binder precursor and latent reactive nanoparticles on a primary substrate.

The methods of the invention may be used to prepare articles and protective coatings that exhibit smudge and abrasion resistance. Deprotection of the surface-modified nanoparticles may be advantageously carried out under mild conditions, thereby allowing the method to be used with thermally or chemically sensitive primary substrates.

In another aspect, the invention provides a nanocomposite article having a first major surface and an interior portion comprising a binder and nanoparticles wherein the first major surface comprises nanoparticles having covalently bonded fluorinated organic groups, and wherein the interior portion comprises latent reactive nanoparticles.

In yet another aspect, the invention provides nanocomposite articles having a first major surface and an interior portion comprising a binder and nanoparticles wherein the first major surface comprises reactive nanoparticles, and wherein the interior portion comprises latent reactive nanoparticles.

In another aspect, smudge resistant nanocomposite hardcoats prepared according to the invention may intimately contact a first major surface of a flexible primary substrate having first and second major surfaces. In some embodiments, an adhesive layer intimately contacts the second major surface. A plurality of such articles may be stacked upon each other to form a stack of adhesive backed protective flexible primary substrates. The number of stacked articles may be from as few as 2 to as many as 1000, or more.

Smudge and abrasion resistant articles and coatings of the invention have particular applicability to the manufacture of electronic displays (especially those having touch screens) and optical elements where scratch and/or smudge resistance is desirable, and are characterized by improved chemical and mechanical durability compared to alternative approaches.

The following definitions apply throughout the specification and claims:

The term "nanoparticle" refers to an inorganic oxide particle characterized typically by a maximum particle diameter size of about 500 nm.

The terms "nanoparticle diameter" and "nanoparticle size" refer to the maximum cross-sectional dimension of a nanoparticle. If the nanoparticle is present in the form of an aggregate, the terms "particle diameter" and "particle size" refer to the maximum cross-sectional dimension of the aggregate.

The term "latent reactive nanoparticle" refers to a nanoparticle having at least one covalently bound organic latent reactive group on its surface.

The term "reactive nanoparticle" refers to a nanoparticle having at least one covalently bound organic reactive group on its surface.

The term "organic latent reactive group" refers to an organic reactive group that has been chemically protected.

The term "nanocomposite" refers to a mixture of either nanoparticles or surface-modified nanoparticles in a binder.

The term "binder precursor" refers to a thermosettable continuous phase of organic material in which nanoparticles are dispersed.

The term "binder" refers to a thermoset continuous phase of organic material in which nanoparticles are dispersed.

The term "thermosettable binder precursor" refers to a binder precursor exhibiting latent crosslinkability, i.e., the thermosettable binder precursor can be thermoset by exposing it to heat and/or actinic radiation (e.g., ultraviolet, visible, and/or e-beam radiation).

The term "latent coupling agent" refers to an organic compound having one or more reactive groups capable of covalently bonding to a nanoparticle surface, and having one or more protected reactive groups which upon deprotection form one or more reactive groups capable of covalently bonding to a reactive fluorochemical, and optionally to a binder precursor.

The term "deprotect" refers to the process of transforming a chemically unreactive group into a reactive one within the context of the chemical system in which it is present.

The term "fluorinated organic group" refers to an organic group containing fluorine in an amount of at least 20 weight percent.

The term "fluorochemical" refers to a compound having a fluorinated organic group.

The term "reactive fluorochemical" refers to a fluorochemical that reacts with the deprotected functional group of a latent coupling agent on a surface-modified nanoparticle.

The term "primary substrate" refers to a substrate bearing a nanocomposite hardcoat.

The term "secondary substrate" refers to a substrate adhesively bonded to a primary substrate bearing a nanocomposite hardcoat.

The term "substrate", when used alone without the modifiers "primary" or "secondary", refers any substrate, whether primary, secondary, or other.

DETAILED DESCRIPTION OF THE INVENTION

Figure 1:
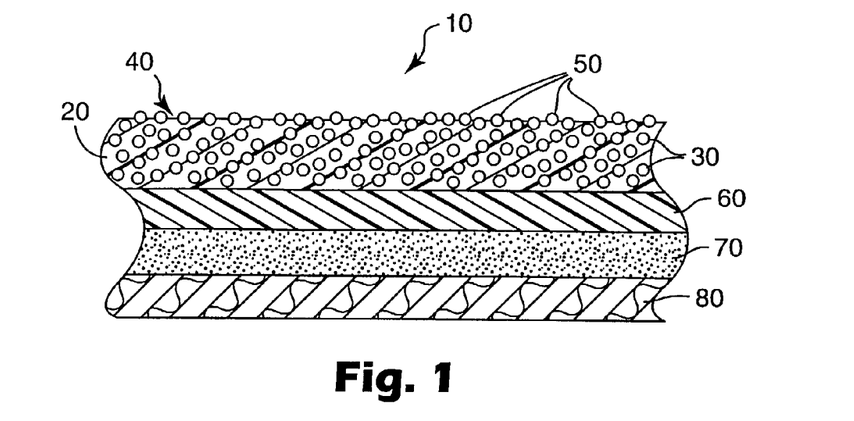
FIG. 1 is a cross-sectional view of a composite article having a smudge resistant nanocomposite hardcoat in intimate contact with a primary substrate.

Referring now to FIG. 1, one embodiment of the invention concerns an article 10 having smudge and abrasion resistant properties. Nanoparticles 30 are contained within a binder phase 20 to form a nanocomposite 40. Nanoparticles having covalently bound fluorinated organic groups 50 are exposed at the surface of the nanocomposite to impart smudge resistance. Nanocomposite 40 may optionally be supported on a first major surface of a primary substrate 60. Primary substrate 60 may optionally have a second major surface that intimately contacts optional adhesive layer 70. The optional adhesive layer may be supported on a release liner 80.

Figure 2:
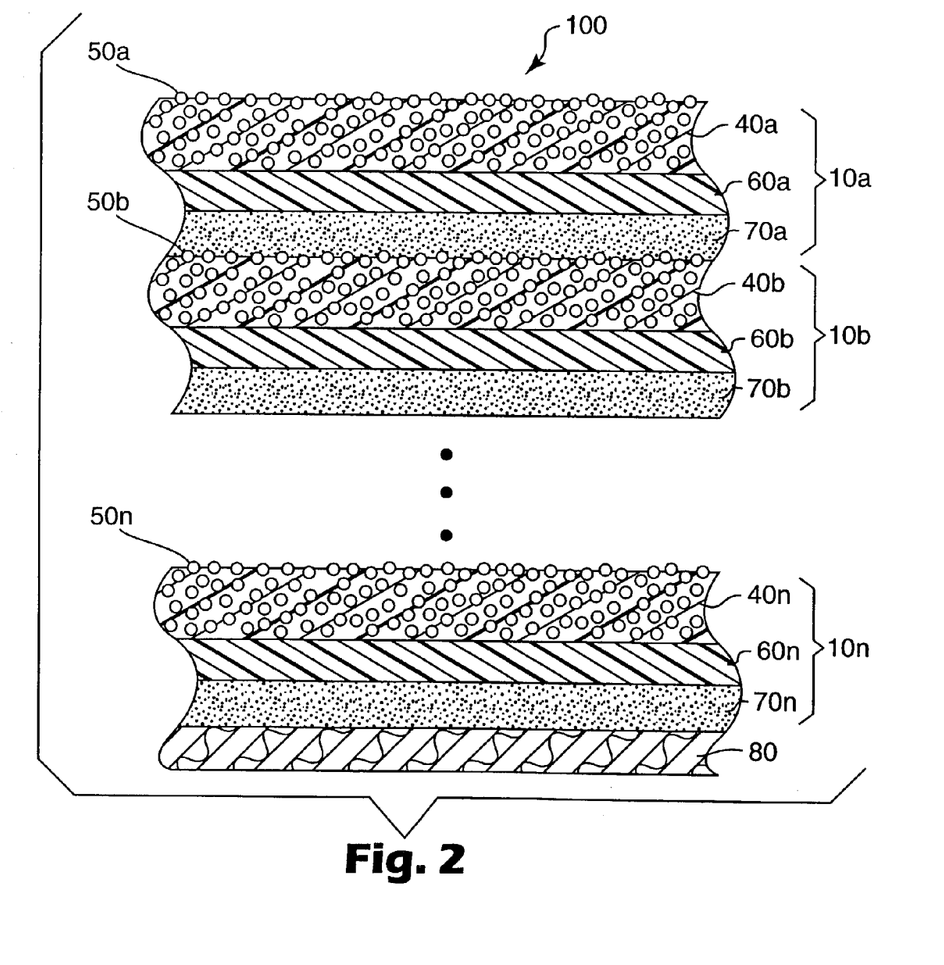
FIG. 2 is a cross-sectional view of a composite article in the form of a stack of adhesive backed smudge resistant nanocomposite hardcoat coated primary substrates.

Referring now to FIG. 2, another embodiment of the invention concerns a composite article 100 in which multiple composite articles 10, denoted 10a, 10b, . . . 10n, are provided in the form of a stack. In the stack, all individual adhesive layers 70a, 70b, . . . except 70n of respective composite articles 10a, 10b, . . . 10n intimately contact smudge resistant nanocomposite hardcoats 50b, . . . 50n of adjacent composite articles 10b, . . . 10n. Outermost adhesive layer 70n intimately contacts primary substrate 60n and may be supported on an optional release liner 80. The number of multiple composite articles 10 stacked in this embodiment is at least 2, and typically may be greater than 5 or more.

Figure 3:
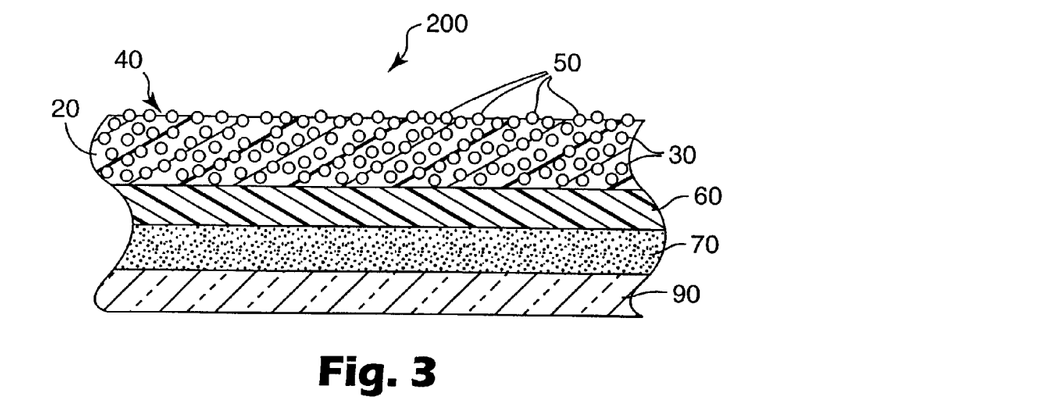
FIG. 3 is a cross-sectional view of an adhesive backed primary substrate film having a smudge resistant nanocomposite hardcoat applied to a secondary substrate.

Referring now to FIG. 3, another embodiment of the invention concerns a composite article 200 in which nanocomposite 40 is supported on a first major surface of a flexible primary substrate 60. Nanoparticles 30 are contained within a binder phase 20 to form a nanocomposite 40. Nanoparticles having covalently bound fluorinated organic groups 50 are exposed at the surface of the nanocomposite to impart smudge resistance. Nanocomposite 40 is supported on a first major surface of a primary substrate 60. Primary substrate 60 has a second major surface that intimately contacts adhesive layer 70. Adhesive layer 70 is bonded to secondary substrate 90.

Figure 4:
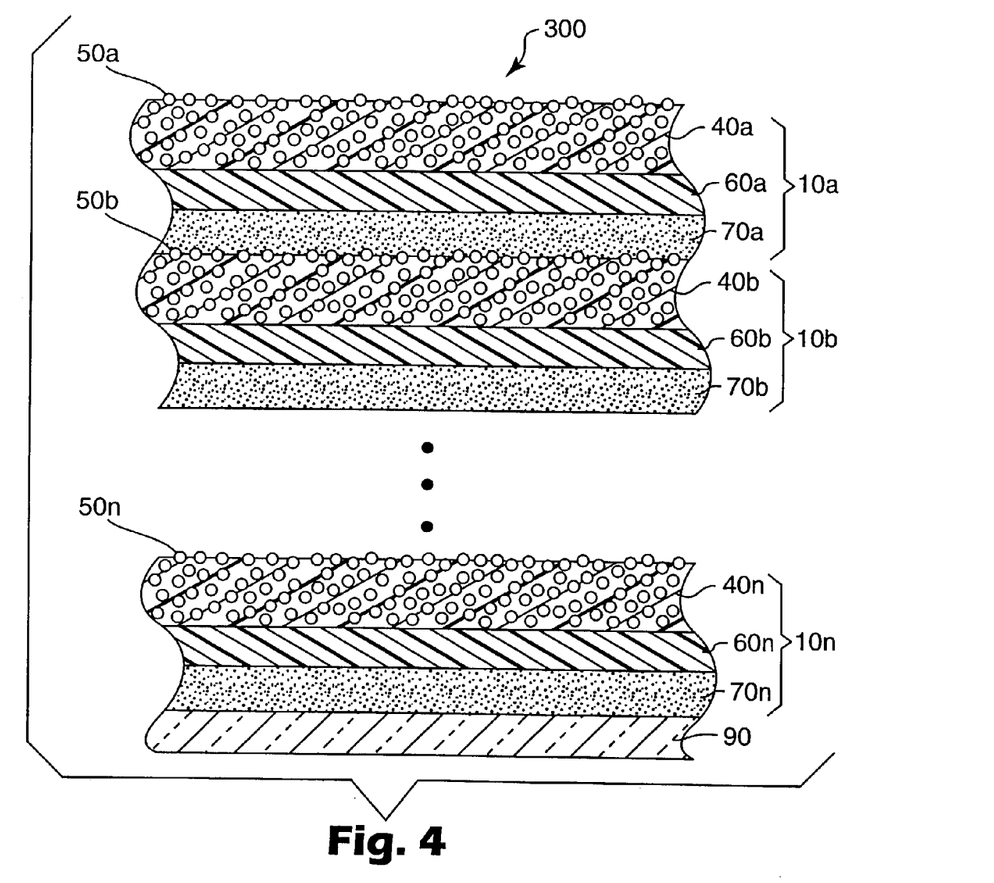
FIG. 4 is a cross-sectional view of a composite article in the form of a stack of adhesive backed smudge resistant nanocomposite hardcoat coated primary substrates adhesively bonded to a secondary substrate.

Referring now to FIG. 4, another embodiment of the invention concerns a composite article 300 in which multiple composite articles 10, denoted 10a, 10b, . . . 10n, are provided in the form of a stack. In the stack, all individual adhesive layers 70a, 70b, . . . except 70n of respective composite articles 10a, 10b, . . . 10n intimately contact smudge resistant nanocomposite hardcoats 50b, . . . 50n of adjacent composite articles 10b, . . . 10n. Outermost adhesive layer 70n intimately contacts primary substrate 60n and is bonded to secondary substrate 90. The number of multiple composite articles 10 stacked in this embodiment is at least 2, and typically may be greater than 5 or more.

Nanocomposites employed in practice of the invention comprise nanoparticles and a binder resin.

Nanoparticles useful in the invention are typically characterized by an average particle diameter size of from about 1 nm up to about 500 nm. In some embodiments, the nanoparticles typically have an average particle diameter size range of from about 5 nm up to about 200 nm. In embodiments, where transparency is important, the nanoparticles typically have an average particle diameter size of from about 10 to 100 nm. Nanoparticles suitable for use in the invention are typically substantially spherical in shape and are relatively uniform in size and remain substantially non-aggregated, as nanoparticle aggregation may result in precipitation, gelation, or a dramatic increase in sol viscosity that may make uniform coatings difficult to achieve.

In some embodiments, the nanoparticles may aggregate to form aggregate particles, wherein each the aggregate particle comprises a plurality of smaller sized nanoparticles; however, typically the average aggregate particle diameter is less than about 500 nm. For applications in which transparency of the coating is important, an average aggregate particle diameter of 100 nm or less may be desirable.

Typically, the nanoparticles comprise inorganic oxides. Exemplary inorganic oxides include oxides of silicon, chromium, aluminum, titanium, zirconium, zinc, titanium, vanadium, chromium, iron, yttrium, antimony, tin, as well as other colloidal metal oxides, colloidal mixed metal oxides (e.g., mixed oxides of aluminum and silicon), and mixtures thereof. The nanoparticles may also comprise a core of an oxide of one type (or a core of a material other than a metal oxide) on which is deposited an oxide of another type.

A particularly desirable class of nanoparticles for use in practice of the invention includes sols of inorganic oxides (e.g., colloidal dispersions of nanoparticles in liquid media), especially sols of amorphous, semi-crystalline, and/or crystalline silica. Such sols can be prepared by a variety of techniques and in a variety of forms, which include hydrosols (where water serves as the liquid medium), organosols (where organic liquids are used), and mixed sols (where the liquid medium comprises both water and an organic liquid). See, e.g., the descriptions of the techniques and forms given in U.S. Pat. No. 2,801,185 (Iler), U.S. Pat. No. 4,522,958 (Das et al.) and U.S. Pat. No. 5,648,407 (Goetz et al.), which descriptions are incorporated herein by reference.

Useful nanoparticles may also be commercially obtained as colloidal dispersions or sols from vendors such as ONDEO Nalco Co. of Naperville, Ill., for example NALCO 1040, 1042, 1050, 1060, 2327 and 2329 colloidal silicas; Nyacol Nano Technologies, Inc. of Ashland, Mass., for example, NYACOL AL20 colloidal alumina, NYACOL A1530, A1540N and A1550 colloidal antimony pentoxides, NYACOL $CeO_2$ colloidal ceria, NYACOL SN15CG colloidal tin oxide, NYACOL ZR10/20, ZR50/20 PH 0.5, and $ZRO_2$ (ACETATE STABILIZED) colloidal zirconias; NYACOL DP5370 DP5371, and DP5372 colloidal zinc oxides, NYACOL colloidal yttria; and W.R. Grace and Co. of Columbia, Md., for example colloidal silicas sold under the tradename LUDOX.

The surface of nanoparticles typically used in practice of the invention are functionalized with organic moieties that have latent reactive functionality, typically accomplished by the use of latent coupling agents. The organic moieties enable proper dispersion of the nanoparticles in the binder precursor. In the absence of such surface-modification, the nanoparticles may aggregate, clump, precipitate and otherwise result in inhomogeneous mixtures that are less desirable for use as protective nanocomposite hardcoats.

The latent coupling agent typically reacts covalently with the surface of the nanoparticle such that the resultant latent reactive nanoparticle is not reactive to the binder precursor under ambient conditions, yet when the latent reactive nanoparticle is exposed to energy (e.g., heat, light, etc.) or chemical treatment (e.g., exposure to acids, bases, nucleophiles (e.g., fluoride), etc.) it becomes reactive to a reactive fluorochemical and, optionally, the binder precursor (i.e., it becomes deprotected). Thus, it is possible to incorporate nanoparticles having covalently bonded latent reactive groups into reactive binder precursors without causing the mixtures to crosslink, which would render further processing, difficult or even impossible.

Typically, the latent coupling agent comprises one or more groups that are chemically reactive with the nanoparticle surface. Useful latent coupling agents may have groups that are covalently reactive with surface hydroxyl groups of the nanoparticles. Useful groups that are covalently reactive with surface hydroxyl groups are those present in conventional coupling agents, and include groups depicted in Formula I:

(I)

wherein $R^1$ is $C_1$–$C_{20}$ alkoxy, $C_6$–$C_{20}$ aryloxy, halogen or hydroxy, and $R^2$ and $R^3$ may independently be $C_1$–$C_{20}$ alkoxy, $C_6$–$C_{20}$ aryloxy, $C_1$–$C_{20}$ alkyl, $C_6$–$C_{20}$ aryl, $C_7$–$C_{30}$ aralkyl, $C_7$–$C_{30}$ alkaryl, halogen, hydroxy, and hydrogen.

Desirably $R^1$ is $C_1$–$C_4$ alkoxy, $C_6$–$C_{10}$ aryloxy, halogen or hydroxy.

Typical latent coupling agents also have reactive functionality that has been masked by a protecting group, which may be removed when desired, typically after the binder precursor has been cured. For example, the t-butoxycarbonyl group may be used to mask reactive amino functionality as a t-butyl carbamate. Deprotection (i.e., removal) of the t-butyl carbamato protecting group regenerates the original amino functionality.

Examples of useful protecting groups are numerous and may be found in reference works such as P. J. Kocienski, "Protecting Groups", Georg Thieme Verlag, Stuttgart (1994); and T. W. Greene and P. G. M. Wuts, "Protective Groups in Organic Synthesis", Wiley, N.Y. (1999), on the internet, and the like. Although a wide variety of useful reactive groups may be successfully protected and deprotected, desirably, useful reactive groups that may be generated by deprotection have at least one active hydrogen, for example hydroxyl groups, 1° and 2° amino groups, sulfhydryl groups, carboxyl groups, and the like. Of these, amino groups may be desirable in some embodiments because of their high reactivity and ease of handling.

Exemplary protecting groups for amines include, but are not limited to, tertiary alkyl groups such as t-butyl groups; organosilyl groups, such as trialkylsilyl, dialkylarylsilyl, alkyldiarylsilyl and triarylsilyl groups, and the like; alkoxycarbonyl groups, such as alpha-bromobutyloxycarbonyl and t-alkoxycarbonyl groups, including t-butoxycarbonyl, and the like; aryloxycarbonyl groups, such as benzyloxycarbonyl, and the like; haloacetyl groups, such as trifluoroacetyl groups, and the like; sulfonyl groups such as benzenesulfonyl, p-toluenesulfonyl and trifluoromethanesulfonyl groups, and the like; alkylidene groups, such as cyclohexylidene, isopropylidene, N-tert-butylaminomethylene, and the like; arylidene groups such as benzylidene and substituted benzylidene such as p-methoxybenzylidene, salicylidene, and the like; benzyl and substituted benzyl groups, including triphenylmethyl, and the like; etc.

Exemplary protecting groups for alcohols and thiols include, but are not limited to, tertiary alkyl groups such as t-butyl groups; organosilyl groups, such as trialkylsilyl, dialkylarylsilyl, alkyldiarylsilyl and triarylsilyl groups, and the like; alkoxycarbonyl groups, such as t-alkoxycarbonyl groups, including t-butoxycarbonyl, and the like; arlyoxycarbonyl groups, such as benzyloxycarbonyl, and the like; haloacetyl groups, such as trifluoroacetyl groups, and the like; acyl groups, such as acetyl and benzoyl groups, and the like; sulfonyl groups such as benzenesulfonyl, p-toluenesulfonyl and trifluoromethanesulfonyl groups, and the like; alkoxyalkyl and substituted alkoxyalkyl groups, such as methoxymethyl, alpha,alpha-dichloromethoxymethyl, benzyloxymethyl, isobutoxymethyl, and the like; benzyl and substituted benzyl groups, including diphenylmethyl groups, para-nitrobenzyl groups, dibenzosuberyl groups, triphenylmethyl groups, and the like; etc.

Exemplary protecting groups for carboxylic acids include, but are not limited to, alkyl and substituted groups such as t-butyl groups, cyanomethyl groups, and the like; organosilyl groups, such as trialkylsilyl, dialkylarylsilyl, alkyldiarylsilyl and triarylsilyl groups, and the like; alkoxycarbonyl groups, such as t-alkoxycarbonyl groups, including t-butoxycarbonyl, and the like; arlyoxycarbonyl groups, such as benzyloxycarbonyl, and the like; haloacetyl groups, such as trifluoroacetyl groups, trichloroacetyl groups, and the like; acyl groups, such as acetyl and benzoyl groups, and the like; sulfonyl groups such as benzenesulfonyl, p-toluenesulfonyl and trifluoromethanesulfonyl groups, and the like; alkoxyalkyl and substituted alkoxyalkyl groups, such as methoxymethyl, benzyloxymethyl, isobutoxymethyl, tetrahydropyranyl, phenylacetoxymethyl, and the like; benzyl and substituted benzyl groups, including diphenylmethyl groups, dibenzosuberyl groups, triphenylmethyl groups, and the like; etc.

Typically, latent coupling agents are prepared by selecting a conventional coupling agent having a reactive group that is capable of reacting with a fluorochemical, and optionally reacting with the binder precursor, and masking the reactive group with a protecting group so that it is no longer reactive.

A conventional coupling agent is a chemical substance capable of reacting with both the reinforcement (i.e., inorganic particles or fibers) and the resin matrix of a composite material. The selection of the conventional coupling agent will typically depend on the nature of the binder precursor into which the surface-modified nanoparticles are to be dispersed.

Exemplary conventional coupling agents include organosilicon compounds (i.e., silane coupling agents) and organozirconium compounds. Suitable organosilicon compounds include A-151 vinyltriethoxysilane, A-172 vinyltri-(2-methoxyethoxy)silane, A-174 gamma-methacryloxypropyltrimethoxysilane, A-186 3,4-epoxycyclohexylmethyltrimethoxysilane, A-187 gamma-glycidoxypropyltrimethoxysilane, and A-189 gamma-mercaptopropyltrimethoxysilane (commercially available from OSi Specialties, Endicott, N.Y.); Z-6030 gamma-methacryloxypropyltrimethoxysilane, Z-6040 gamma-glycidoxypropyltrimethoxysilane, XZ-8-0951 gamma-mercaptopropyltrimethoxysilane (all commercially available from Dow Corning Corp., Midland, Mich.); A0564 allyltriethoxysilane, D4050 diallyldichlorosilane, D6205 divinyldiethoxysilane, G6720 glycidoxypropyltriethoxysilane, M8542 methacryloxypropyldimethylchlorosilane, and S1588 m,p-styrylethyltrimethoxysilane (commercially available from Petrarch Systems, Inc., Bristol, Pa.); gamma-aminopropyltrimethoxysilane, allyltrimethoxysilane, dimethyldiethoxysilane, dihydroxydiphenylsilane, triethoxysilanol, 3-(2-aminoethylamino)propyltrimethoxysilane, vinyltriacetoxysilane, and the like and mixtures thereof. If the organosilicon compound contains hydrolyzable functional groups such as alkoxy, acyloxy, or halogen, these functional groups can optionally be hydrolyzed to form silanol groups if desired prior to the application of the compound to the surface of the particle. Organozirconium coupling agents include amino functional zircoaluminates, carboxy functional zircoaluminates, and mercapto functional zircoaluminates.

In cases, where the smudge resistant protective coating is to be applied to thermally sensitive articles, chemical deprotection (e.g., using an acid catalyst) may be used.

Additional useful reactive groups that may be generated by deprotection of the surface-modified nanoparticles include those groups that are reactive to groups having active hydrogens. Non-limiting examples of such groups include isocyanato groups, epoxy groups, haloacyl groups, and the like. Of these, isocyanato groups are especially desirable.

Surface-modified nanoparticles may be prepared by a variety of similar general methods. In the case of latent coupling agents having groups of Formula I, surface-modified nanoparticles may be prepared by combining an inorganic particle sol (e.g., a silica sol) with an alcohol water-miscible organic liquid (e.g., an alcohol, ether, etc.) and then adding the latent coupling agent. The mixture is then heated and the latent coupling agent is added dropwise. Water is removed by distillation. The resultant dispersion may be directly combined with the binder precursor and any residual solvent may optionally be removed or replaced.

Typically, surface-modified nanoparticles used in practice of the invention desirably have a particle size of less than about 500 nm, more desirably less than about 200 nm, most desirably less than about 100 nm.

The latent coupling agent used is desirably in an amount sufficient to react with at least 30% of the available nanoparticle surface reactive groups, more desirably with at least 70% of the available nanoparticle surface reactive groups, and still more desirably with at least 90% of the available nanoparticle surface reactive groups. Desirably the amount of latent coupling agent does not exceed 110% of the available nanoparticle surface reactive groups.

Exemplary coupling agents are latent amine coupling agents such as tert-alkyl carbamate organosilicon compounds, and the like. These compounds are readily obtained, are non-reactive to most binder precursors, especially acrylates, and easily deprotected to liberate an amine. The tert-alkyl blocking (protecting) group can be removed thermally (i.e., by heating) or the tert-alkyl protecting group can be removed under mild conditions by the addition of a catalyst such as an acid. As the by-product of deprotection may be a gas, the deprotection step may help to clean the surface of the modified nanoparticles from excess material such as binder residue. Exemplary latent amine coupling agents include, but are not limited to, tert-alkyl carbamate organosilicon compounds as disclosed in U.S. Pat. No.

5,322,873 (Pohl et al.) which compounds and methods for their preparation are incorporated herein by reference.

Exemplary latent amine coupling agents include tert-butyl N-(omega-trialkoxysilylalkyl)carbamates, such as for example tert-butyl N-(3-trimethoxysilylpropyl)carbamate, tert-butyl N-(4-trimethoxysilylbutyl)carbamate, tert-butyl N-(4-trimethoxysilylphenyl)carbamate, tert-butyl N-(4-trimethoxysilylbenzyl)carbamate, tert-butyl N-(3-triethoxysilylpropyl)carbamate, and the like.

Exemplary, latent isocyanate group containing coupling agents include organosilicon aspartic ester compounds. These compounds are readily obtained, are non-reactive to most binder precursors, and easily deprotected to liberate an isocyanate.

In certain cases, it may be necessary to use additional coupling agents not having latent functionality in order to achieve compatibility of the surface-modified nanoparticles with the binder precursor. Procedures and materials for accomplishing this are disclosed in commonly assigned "Energy Curable Inks And Other Compositions Incorporating Surface Modified, Nanometer-Sized Particles", U.S. Ser. No. 09/756,303 (Wu et al.), filed Jan. 8, 2001, which procedures and materials are incorporated herein by reference.

The surface-modified nanoparticles are intimately mixed with a curable binder precursor that may be subsequently processed prior to curing. The choice of binder precursor is not critical so long as it is not reactive under ambient conditions with the surface-modified nanoparticles. Examples of binder precursors include, but are not limited to, free-radically polymerizable monomers and oligomers such as acrylates, methacrylates, allylic compounds, vinyl ethers, vinyl esters, and the like; epoxy resins; alkyd resins; phenolic resins; cyanate esters; melamine and melamine-formaldehyde resins; polyurethane resins and mixtures thereof. Desirably, binder precursors comprise acrylates and/or methacrylates.

The binder precursor may include a catalyst or other curative in order to facilitate cure. Such catalysts and other curatives will depend on the nature of the binder precursor and may include those well known in the curing art, for example, thermal free radical initiators such as peroxides and azo compounds, free radical photoinitiators, latent acid catalysts, amine hardeners, mercaptans, etc.

The binder precursor may be cured by application of energy such as heat or actinic radiation (e.g., ultraviolet light and electron beam radiation), or through addition of a catalyst or curative. Desirably, in the case of free-radically polymerizable binder precursors, a photoinitiator is present in the binder precursor and the mixture is irradiated with ultraviolet actinic radiation from a lamp, desirably in an inert atmosphere such as nitrogen. The use of actinic radiation to cure the binder precursor allows a high degree of flexibility in the choice of protecting groups.

When used, the amount of actinic radiation energy used for curing depends upon a number of factors, such as the amount and the type of reactants involved, the energy source, web speed, the distance from the energy source, and the thickness of the material to be cured. As general guidelines, actinic radiation typically involves a total energy exposure from about 0.1 to about 10 Joules per square centimeter, and electron beam radiation typically involves a total energy exposure in the range from less than 1 megarad to 100 megarads or more, desirably 1 to 10 megarads. Exposure times may be from less than about 1 second up to 10 minutes or more.

Commercially available free-radical generating photoinitiators suitable for the invention include, but are not limited to, benzophenone, benzoin ether and acylphosphine photoinitiators such as those sold under the trade designations IRGACURE and DAROCUR from Ciba-Geigy Corp. of Ardsey, N.Y. The amount of photoinitiator(s) used typically varies between 0.1 and 15 weight percent, desirably between 0.5 and 7 weight percent based on the total weight of the binder precursor. Co-initiators and amine synergists can be included in order to improve curing rate. Examples include isopropylthioxanthone, ethyl 4-(dimethylamino)benzoate, 2-ethylhexyl dimethylaminobenzoate, and dimethylaminoethyl methacrylate.

The binder precursor/surface-modified particle mixture may contain additional solvents, catalysts, hardeners, matting agents, antioxidants, UV stabilizers, optical brighteners, pigments, and the like. If a solvent is used, it may be present in sufficient amount to facilitate the chosen coating method and desired film thickness. Thus, solvent or solvents may be present at level up to 95 weight percent or even more. Alternatively, in many cases it may advantageous to use solvent-free formulations.

The volume ratio of surface-modified nanoparticles to binder precursor may range from 1:99 up to 70:30, desirably from 5:95 up to 55:45, and more desirably from 10:90 up to 40:60.

Deprotection of the surface-modified nanoparticles is carried out after the binder precursor resin is cured to form a nanocomposite material. Deprotection may be done exclusively on the surface, or throughout the bulk (as for example by heating), of the nanocomposite. If carried out on the surface, such as by contact with an acid catalyst, or by application of heat, the process may be carried out in an image-wise fashion, such as by writing with a laser, to allow image-wise bonding of the fluorinated organic group.

Surface treatment of the deprotected nanocomposite hardcoat with a reactive fluorochemical imparts smudge resistance to the hardcoat. The choice of reactive fluorochemical will necessarily depend on the nature of the latent coupling agent. Desirably, the reactive fluorochemical is reactive to primary and/or secondary amines to form a covalent bond at temperatures of less than 100° C., desirably less than 50° C., and more desirably at ambient temperatures. The formation of permanent covalent bonds helps to ensure durability of the resultant coating. Surface treatment of the nanocomposite hardcoat with the reactive fluorochemical may generally be achieved by immersing or otherwise coating a surface of the nanocomposite hardcoat with the reactive fluorochemical, and optionally heating. Excess reactive fluorochemical and reaction byproducts are rinsed away to yield the inventive smudge resistant nanocomposite hardcoats.

Exemplary reactive fluorochemicals include perfluoropolyether mono- or di-esters. Desirably, perfluoropolyether esters have the formula $RO_2CCF_2O(CF_2O)_a(C_2F_4O)_bCF_2CO_2R$ where R represents an alkyl group having from 1 to 8 carbon atoms, and a and b represent integers greater than 4. Materials of this type are available under the FOMBLIN trade designation (e.g., FOMBLIN Z-DEAL) from Ausimont USA of Morristown, N.J. Additional desirable perfluoropolyether esters are described in U.S. Pat. No. 5,488,142 (Fall et al.) which perfluoropolyether esters and their methods for making are incorporated herein by reference, and perfluoropolyether esters described by the formula $CH_3O_2CCF(CF_2)O(CF(CF_3)CF_2O)_nCF(CF_3)CO_2CH_3$, where n is greater than 4, desirably approximately 10 which are commercially available from E. I. du Pont de Nemours Co., Wilmington, Del., under the trade designation KRY- TOX. Reaction of a perfluoropolyether ester with a deprotected latent amine on a surface modified nanoparticle results in a covalently attached fluorinated organic group having a perfluoropoly(alkyleneoxy) segment.

Additional exemplary reactive fluorochemicals include those having a $C_4$–$C_{18}$ perfluoroalkyl group. Non-limiting examples of such materials include perfluorobutanesulfonyl fluoride, perfluorobutyl iodide, perfluorododecyl iodide, perfluorohexyl bromide, perfluorooctanesulfonyl fluoride all of which are commercially available from Sigma-Aldrich Chemical Co. of Milwaukee, Wis.

Smudge resistant nanocomposite hardcoats of the invention may be utilized on virtually any substrate (e.g., primary or secondary), rigid or flexible, but the greatest benefit will be obtained when on a substrate that may be easily scratched. Non-limiting examples of such substrates may include glass (including electronic displays), quartz, transparent or translucent ceramics wood, metal, painted surfaces including painted metals, and thermoset and thermoplastic materials such as acrylic polymers (e.g., polymethyl methacrylate), polycarbonates, polyurethanes, polystyrene, styrene copolymers such as acrylonitrile-butadiene-styrene copolymer and acrylonitrile-styrene copolymer, cellulose esters (e.g., cellulose acetate, cellulose diacetate, cellulose triacetate and cellulose acetate-butyrate copolymer), polyvinyl chloride, polyolefins (e.g., polyethylene and polypropylene), polyamides, polyimides, phenolic resins, epoxy resins, polyphenylene oxide, and polyesters (e.g., polyethylene terephthalate). The thermoplastics may contain fillers and other adjuvants, and be either opaque or transparent depending on the application.

For some applications, it may be desirable for the smudge resistant nanocomposite hardcoats of the invention to be anti-reflective. In such embodiments, the layer of fluorinated material covalently attached to the surface of the deprotected nanocomposite hardcoat fluorinated "layer" desirably has a thickness of at least about ¼ wavelength thickness (i.e., at least about 100 nanometers thickness).

Substrates useful in practice of present invention may be virtually any thickness as dictated by the specific application. Typically, for flexible thermoplastic film substrates it typically ranges from about 0.1 mm to about 1 mm. Substrates can be a laminate of two or more different materials adhered together, either with or without an adhesive layer therebetween.

In embodiments of the invention employing more than one primary substrate, as in the case of a stacked article, or in the case of a flexible primary substrate bonded to a secondary substrate, the substrates may individually be the same or different.

In some instances, rigid substrates have been found to enhance the properties of the smudge resistant nanocomposite hardcoats prepared according to the invention, as compared to flexible substrates. Thus, depending on the need, either a flexible or rigid substrate may be chosen.

Thermoplastic polymer substrates can be formed into a film using conventional filmmaking techniques such as extrusion, with optional uniaxial or biaxial orientation of the extruded film. If desired, the primary substrate can, optionally, be treated to improve adhesion between the primary substrate and the nanocomposite hardcoat, using, e.g., a corona treatment such as air or nitrogen corona, plasma flame, or actinic radiation. If desired, an optional tie layer can also be applied between the primary substrate and the nanocomposite hardcoat to increase the interlayer adhesion.

If desired, an organic solvent can be added to the resulting ceramer composition before it is applied, in order to impart improved viscosity characteristics and assist in coating the ceramer composition onto the primary substrate. After coating, the ceramer composition can be dried to remove any added solvent.

The primary substrate may have an adhesive backing, optionally in intimate contact with (i.e., supported on) a release liner. Typical useful adhesives include pressure-sensitive adhesives, hot melt adhesives and thermosettable adhesives. Exemplary release liners include silicone treated papers and polymer films.

If an adhesive is present, it is desirably transparent or sufficiently translucent so that it will not unduly hamper viewing of an underlying display device. The adhesive can be derived from a natural product (e.g., a rubber-base adhesive) or can be a synthetic material such as a homopolymer, random copolymer, graft copolymer, or block copolymer. The adhesive can be crosslinked or uncrosslinked, tacky or non-tacky. Desirably the adhesive has pressure-sensitive properties. An accepted quantitative description for pressure-sensitive adhesives (PSA's) is given by the Dahlquist criterion, which indicates that materials having a storage modulus (G') of less than about $3 \times 10^5$ Pascals (measured at 10 radians/second at room temperature, about 20° C. to 22° C.) have pressure-sensitive adhesive properties while materials having a G' in excess of this value do not. Exemplary suitable adhesives include those described in U.S. Pat. No. 5,389,438 (Miller et al.); U.S. Pat. No. 5,851,664 (Bennett et al.); U.S. Pat. No. 6,004,670 (Kobe et al.); and U.S. Pat. No. 6,099,682 (Krampe et al.).

Desirably the adhesive comprises a thermoplastic block copolymer elastomers (copolymers of segmented A and B blocks or segments, displaying both thermoplastic and elastomeric behavior). Useful thermoplastic block copolymer elastomers include multi-block copolymers having radial, linear A-B diblock, and linear A-B-A triblock structures, as well as blends of such copolymers. Suitable commercially available thermoplastic block copolymer elastomers include the SOLPRENE™ family of materials (Philips Petroleum Co.), the FINAPRENE™ family of materials (FINA), the TUFPRENE™ and ASAPRENE™ family of materials (Asahi), the STEREON™ family of materials (Firestone Synthetic Rubber & Latex Co.), the EUROPRENE SOL T™ family of materials (Enichem), the VECTOR™ family of materials (Dexco Polymers), and the CARIFLEX TR™ family of materials (Shell Chemical Co.). Other suitable adhesive materials include highly crosslinked acrylic adhesives, silicone polyurea elastomers such as are described in U.S. Pat. No. 5,670,598 (Leir et al.), the SEPTON™ family of materials (Kuraray Co. Ltd.) and the KRATON™ family of materials (Shell Chemical Co.) such as KRATON D-1101, D-1102, D-1107, D-1111, D1112, D-1113, D-1114PX, D-1116, D-1117, D-1118, D-1119, D-1122X, D-1124, D-1125PX, D-1160, D-1165, D-1161, D-1184, D-1193, D-1300, D-1320X, D-4141, D-4158, D-4433, RP-6485, RP-6409, RP-6614, RP-6906, RP-6912, G-1650, G-1651, G-1652, G-1654, G-1657, G-1701, G-1702, G-1726, G-1730, G-1750, G-1765, G-1780, FG-1901, FG1921, FG-1924, and TKG-101. Mixtures of adhesive materials can also be used.

The adhesive (or a liner that protects the adhesive from contamination and bears against the adhesive) can be micro-textured. Typically the adhesive layer of a single sheet or the lowermost layer of a stack of sheets will be covered by a liner. If the adhesive is a tacky adhesive, then the liner desirably has a low surface energy. If the adhesive is low tack or non-tacky then a liner made of plain paper or other high surface energy material may be used.

The substrate can be made by a variety of different methods. For example, a thermoplastic material can be extruded as a film and then cut to the desired dimension. It can be molded to form the desired shape and dimensions. Also, it can be solvent cast and subsequently heated and stretched to form a film.

The primary substrate underlying the smudge resistant nanocomposite hardcoat may include a primed surface, typically in contact with the smudge resistant nanocomposite hardcoat. The primed surface can result from the application of a chemical primer layer, such as an acrylic layer, or from chemical etching, electron-beam irradiation, corona treatment, plasma etching, or co-extrusion of adhesion promoting layers.

The smudge resistant nanocomposite hardcoat may be formed on the primary substrate in a variety of ways. Typically the mixture of binder precursor containing surface-modified nanoparticles and any additional ingredients (e.g., solvent, catalyst, curative, etc.) may be coated onto the primary substrate prior to curing. Suitable coating methods include, for example, spin coating, knife coating, wire coating, flood coating, padding, spraying, exhaustion, dipping, roll coating, foam techniques, and the like.

The thickness of the coating of curable coating composition that is applied will depend on the particular primary substrate and application. The thickness of the film should be sufficient so that when the composition is cured, the protective layer will have a final thickness that ranges from about 1 nm up to about 50 microns or even thicker, desirably from about from about 0.5 microns to about 10 microns, and more desirably from about from about 3 microns to about 6 microns. Thicker protective layers can lead to crazing and other defects over time; however, thinner layers often do not provide enough surface material to be scratch resistant.

When present as a coating on transparent or translucent substrates, the ingredients in the smudge resistant nanocomposite hardcoat are desirably chosen so that the cured hardcoat has a refractive index close to that of the substrate. This can help reduce the likelihood of Moire patterns or other visible interference fringes.

Those skilled in the art will also appreciate that the smudge resistant nanocomposite hardcoat can contain other optional adjuvants, such as surface treatment agents, surfactants, antistatic agents (e.g., conductive polymers), leveling agents, initiators (e.g., photoinitiators), photosensitizers, UV absorbers, stabilizers, antioxidants, fillers, lubricants, pigments, dyes, plasticizers, suspending agents, and the like.

Exemplary substrates on which the smudge resistant protective coatings may be applied and used as described herein include, but are not limited to, optical elements such as lenses (including eyeglass lenses, camera lenses, binocular lenses, telescope lenses, fresnel lenses, etc.), mirrors, watch crystals, holograms, windows, computer privacy filters, compact discs, DVD discs, and the like; articles with electronic display devices including touch-screen displays (such as those of computer touch screens and personal data assistants), televisions, flexible electronic displays such as electronic paper, computer monitors, cellular phones, global positioning systems, calculators, and the like; graphic articles, including outdoor signage including backlit and traffic signage; motor vehicles, sculpture, membrane switches, jewelry, and the like.

EXAMPLES

The following terms and materials are used in the examples:

"Wt. %" means weight percent.

"NM" as it appears in the Tables means not measured.

3M 906 ABRASION RESISTANT COATING TRANSPARENT—50% SOLIDS is a trade designation for a photocurable dispersion of colloidal silica—acryloxypropyltrimethoxy silane polymer in acrylate monomers. The dispersion is approximately 50 wt. % in 2-propanol, commercially available from Minnesota Mining and Manufacturing Company, St. Paul, Minn.

Acrylic sheeting used in the examples was 3.2 mm thick OPTIX, commercially available from Plaskolite, Inc., Columbus, Ohio.

Dibutyltin dilaurate is available from Aldrich Chemical Co., Milwaukee, Wis.

DOWANOL PM is a trade designation for 1-methoxy-2-propanol (CAS No. 111-77-3), available from Dow Chemical Co., Midland, Mich.

EBECRYL 220 is a trade designation for a hexafunctional aromatic urethane acrylate containing an acrylated polyol diluent, having a 1000 g/mol oligomer molecular weight, commercially available from UCB Radcure, Smyrna, Ga.

FOMBLIN Z-AL is a trade designation for a perfluoropolyether diester $CH_3O_2CCF_2O(CF_2O)_m(C_2F_4O)_pCF_2CO_2CH_3$ (<m> and <p> are approximately 9–11, wherein < > refers to an average value) available from Ausimont USA, Inc., Morristown, N.J.

"HFE-7100" refers to HFE-7100 3M NOVEC ENGINEERED FLUID which is a trade designation for a mixture of methyl nonafluoroisobutyl ether 50–70 wt. % and methyl nonafluorobutyl ether 30–50 wt. %, available from Minnesota Mining and Manufacturing Company, St. Paul, Minn.

IRGACURE 184 is a trade designation for 1-hydroxycyclohexyl phenyl_ketone, a photoinitiator, commercially available from Ciba Specialty Chemicals, Tarrytown, N.Y.).

KIMWIPE is a trade designation for a lintless paper wiper, available from Kimberly-Clark Corp., Roswell, Ga.

NALCO 2327 is a trade designation for a 40 wt. % silica content ammonia stabilized silica sol having a 20 nm average particle size, a surface area of 150 $m^2/g$, and a pH of 9.3, commercially available from ONDEO Nalco Co., Naperville, Ill.

SARTOMER 295 is a trade designation for pentaerythritol tetraacrylate, SARTOMER 444 is a trade designation for pentaerythritol triacrylate, and SARTOMER CD 1010 is a trade designation for a mixed triarylsulfonium hexafluoroantimonate salt cationic photoinitiator, each commercially available from Sartomer Co., Exton, Pa.

"SHARPIE" refers to a No. 30001 Black SHARPIE FINE POINT PERMANENT MARKER which is a trade designation for black permanent markers, available from Sanford Corporation, Bellwood, Ill.

UV Processor A was a Model # MC-6RQN UV processor was obtained from Fusion UV Systems Corp., Rockville, Md., and was equipped with a "H"-type bulb.

UV Processor B was a model VPS-6 (run at 100% power) power supply with an EPIQ 6000 irradiator, available from Fusion UV Systems, Corp., Rockville, Md., and was equipped with a "H"-type bulb.

Wire wound rods were obtained from R D Specialties, Webster, N.Y.

The following test methods were used in the examples that follow:

Permanent Marker Pen Challenge Test

The Permanent Marker Pen Challenge test consists of two parts:

Ink Beading Test

Smudge resistant properties of the coatings were evaluated by an ink removal test performed using repeated cycles of applying SHARPIE black permanent ink followed by dry wiping with a KIMWIPE paper wiper using hand pressure. According to the test procedure, lines are written on an approximately 2.5 cm×2.5 cm area of sample to be tested using a SHARPIE black permanent marker. Results are determined by visual inspection: P means that the ink beads up as discrete droplets; PB means that ink beads up forming lines or non-discrete droplets; F means ink beading does not occur on the surface of the sample being tested.

Ink Removability Test

The ink is wiped using a dry KIMWIPE paper wiper and light hand pressure. Results are determined by visual inspection: P means the ink is "removed" easily; F means the ink residue remains on the wiped surface; PB means that ink removal from the surface may only be achieved using added pressure. The test is repeated until failure is observed. Ease of ink removal as a function of the number of cycles was noted.

Dry Rub Durability Test

The dry rub test is based on MIL Spec C-48497A. It involved applying a 1.0 kg force perpendicular to the surface for a number of cycles. One cycle=2 "Dry Rubs". The area abraded is about 1 cm wide by 7 cm long. Twelve layers of Grade 90 cheese cloth (Cat. No. 12905) available from Summers Optical, EMS Contract Packaging (Fort Washington, Pa.), was used to abrade the surface. After abrasion test results were obtained by visual inspection: P means there is no visible deterioration of surface reflectance where rubbed; F means deterioration of the surface where rubbed is evident.

After performing the dry rub durability test, the abraded area is then typically challenged by the ink beading and ink removability tests.

Chemical Exposure Test

Droplets (15–20 mm diameter) of COCA-COLA soda pop, coffee, tomato sauce, acetone, isopropyl alcohol, glass cleaner, permanent ink and diluted ammonia are placed onto the surface of the material(s) to be tested. The droplets are allowed to remain on the surface for 24 hours at room temperature. Each droplet is then dry-wiped by hand with a KIMWIPE paper wiper, and each area is inspected visually for sign of degradation.

PREPARATION OF INTERMEDIATE COMPOSITONS

Preparation of (tert-butylcarbamatopropyl)triethoxysilane:

Neat tert-butanol (19.47 g, 0.263 mol) was added to isocyanatopropyltriethoxysilane (50 g, 0.202 mol) under a dry nitrogen atmosphere. Dibutyltin dilaurate (0.4 g) was added to the stirred, room temperature mixture as a catalyst. The mixture was heated to 55° C. for 48 hours. Excess tert-butanol was removed under vacuum at 55° C. to provide the pure (tert-butylcarbamatopropyl)triethoxysilane in essentially quantitative yield as a colorless liquid.

Preparation of (tert-butylcarbamatopropyl)triethoxysilane Modified Colloidal Silica Sol (Sol A):

NALCO 2327 (54.92 g) colloidal silica was diluted with DOWANOL PM ether (propylene glycol methyl ether, commercially available from Dow Chemical Co., Midland, Mich.) to achieve a 25 wt. % silica concentration and then heated. When the temperature of the mixture reached 65° C., (tert-butylcarbamatopropyl)triethoxysilane (2.82 g, 0.009 mol) was added dropwise. Water was removed from the mixture by distillation. During the distillation, DOWANOL PM ether was periodically replenished to maintain the solids content at about 25 wt. %. When the vapor temperature reached 117° C., distillation was stopped providing a transparent sol having 23 wt. % silica content (Sol A).

Preparation of a Methacryloxysilane Surface Functionalized Silica Sol (Sol B):

NALCO 2327 (371.92 g) was diluted with 250.9 g of DOWANOL PM. The mixture was stirred with heating. 3-(Methacryloxypropyl)trimethoxysilane (18.70 g) was diluted with 23.63 g DOWANOL PM and added to the mixture when the liquid reached 74.5° C. An additional 112.98 g DOWANOL PM was added immediately and more (a total of 733.2 g of additional alcohol) was added throughout the process. The distillation was discontinued when the liquid reached ~120° C., resulting in a clear sol which had 28.0 wt. % silica content (Sol B).

Preparation of (tert-butylcarbamatopropyl)triethoxysilane Modified Colloidal Silica Sol (Sol C):

NALCO 2327 (70.00 g) was diluted with DOWANOL PM ether to achieve a 25 wt. % silica concentration and then heated. When the temperature of the mixture reached 65° C., (tert-butylcarbamatopropyl)triethoxysilane (5.58 g, 0.017 mol) was added dropwise. Water was removed from the mixture by distillation. During the distillation, DOWANOL PM ether was periodically replenished to maintain the solids content at about 25 wt. %. When the vapor temperature reached 117° C., distillation was stopped providing a transparent sol having 22.5 wt. % silica content (Sol C).

Preparation of Nanocomposite Hardcoat H1 on an Acrylic Sheet:

A 1:1 weight ratio mixture of pentaerythritol triacrylate and EBECRYL 220 was added to Sol A to provide a coating solution having approximately 30 wt. % total solids (silica and acrylates combined).

IRGACURE 184 photoinitiator was added to the coating solution at a level of 2 wt. % based on total solids weight of the solution. The coating solution was then flowcoated through a 1 micron glass fiber syringe filter onto an acrylic sheet and the excess coating solution allowed to drip into a collection tray for 4 minutes. The coated sheet was then placed in a fume hood with 200 ft/min (61 m/min) air flow for 12 minutes to remove the DOWANOL PM ether by evaporation.

The coated acrylic sheet was then cured using UV Processor A under nitrogen, at a translation speed of 20 ft/min (6.1 n/min) to form nanocomposite hardcoat H1 as a coating on an acrylic sheet.

Preparation of Nanocomposite Hardcoat H2 on an Acrylic Sheet:

To Sol A (42.4 g) was added in order 5.0 g SARTOMER 444, 5.0 g EBECRYL 220, 5.0 g methoxy-2-propanol, 0.40 g IRGACURE 184, and 2.0 g SARTOMER CD 1010 initiator (theoretical silica content was 50 wt. %). The mixture was then flow-coated through a 1 micron glass fiber syringe filter onto an acrylic sheet and the excess coating solution allowed to drip into a collection tray for 4 minutes. The coated sheet was then placed in a fume hood with 200 ft/min (61 m/min) air flow for 12 minutes to remove the DOWANOL PM by evaporation. The curing of the nanocomposite coating took place in the presence of nitrogen, at a translation speed of 20 ft/min (6.1 m/min) through UV Processor A to give nanocomposite hardcoat H2 coated on an acrylic sheet.

Preparation of Nanocomposite Hardcoat H3 on an Acrylic Sheet:

To a mixture of 8.5 g Sol A and 28.0 g Sol B was added 5.0 g, SARTOMER 444 and 5.0 g EBECRYL 220. To this mixture was added 19.25 g methoxy-2-propanol and 0.40 g IRGACURE 184 radical initiator (theoretical silica content was 50 wt. %). The mixture was then flow-coated through a 1 micron glass fiber syringe filter onto an acrylic sheet and the excess coating solution allowed to drip into a collection tray for 4 minutes. The coated sheet was then placed in a fume hood with 200 ft/min (61 m/min) air flow for 12 minutes to remove the DOWANOL PM by evaporation. The curing of the nanocomposite coating took place in the presence of nitrogen, at a translation speed of 20 ft/min (6.1 m/min) through UV Processor A resulting in nanocomposite hardcoat H3 coated on an acrylic sheet.

Preparation of Nanocomposite Hardcoat H4 on an Acrylic Sheet:

To a mixture of 25.5 g Sol A and 14.3 g Sol B was added 5.0 g SARTOMER 444 and 5.0 g EBECRYL 220. To this mixture was added 19.25 g methoxy-2-propanol and 0.40 g IRGACURE 184 photoinitiator (theoretical silica content was 50 wt. %). The mixture was then flow-coated through a 1 micron glass fiber syringe filter onto an acrylic sheet and the excess coating solution allowed to drip into a collection tray for 4 minutes. The coated sheet was then placed in a fume hood with 200 ft/min air flow for 12 minutes to remove the DOWANOL PM by evaporation. The curing of the nanocomposite coating took place in the presence of nitrogen, at a translation speed of 20 ft/min (6.1 m/min) through UV Processor A resulting in nanocomposite hardcoat H4 coated on an acrylic sheet.

Preparation of Nanocomposite Hardcoat H5 on Polyester Film:

To 30.0 g Sol C was added 3.38 g, SARTOMER 295, 3.38 g EBECRYL 220 and 0.07 g IRGACURE 184 radical initiator (theoretical silica content was 50 wt. %). The mixture was coated on 0.127 mm thick polvinylidene chloride primed polyethylene terephthalate film using a wire wound rod (#9, nominal wet film thickness=20.3 micron). The coated film was then placed in a fume hood with 22.9 m/min air flow for 12 minutes to remove the DOWANOL PM by evaporation. The curing of the nanocomposite coating took place in the presence of nitrogen, at a translation speed of 12.2 m/min through UV Processor B, resulting in nanocomposite hardcoat H5 coated on the polymer film primary substrate.

Preparation of Nanocomposite Hardcoat H6 on Cellulose Triacetate Film:

To 30.0 g Sol C was added 3.38 g, SARTOMER 295, 3.38 g EBECRYL 220 and 0.07 g IRGACURE 184 radical initiator (theoretical silica content was 50 wt. %). The mixture was coated onto 0.076 mm thick unprimed cellulose triacetate (TAC) film primary substrate using a wire wound rod (#9, nominal wet film thickness=20.3 micron). The coated film was then placed in a fume hood with 22.9 m/min air flow for 12 minutes to remove the DOWANOL PM by evaporation. The curing of the nanocomposite coating took place in the presence of nitrogen, at a translation speed of 30.5 m/min through UV Processor B, resulting in nanocomposite hardcoat H6 coated on the polymer film primary substrate.

Example 1

This example describes the preparation of an acrylic sheet having a deprotected nanocomposite hardcoat layer.

A nanocomposite hardcoat H1 coated acrylic sheet, prepared as described above, was soaked for 1.5 hours in a 10 wt. % aqueous solution of methanesulfonic acid, rinsed with distilled water, and immediately treated with 8 wt. % aqueous potassium hydroxide for 1 minute. The coated sheet was thoroughly rinsed with distilled water and allowed to dry in air resulting in a deprotected nanocomposite hardcoat as a coating on an acrylic sheet.

Example 2

This example describes the preparation of an acrylic sheet having a deprotected nanocomposite hardcoat layer.

The procedure of Example 1 was repeated except that the nanocomposite hardcoat was soaked for 3 hours in a 10 wt. % aqueous solution of methanesulfonic acid.

Example 3

This example describes the preparation of an acrylic sheet having a deprotected nanocomposite hardcoat layer.

The procedure of Example 1 was repeated except that the nanocomposite hardcoat was flow coated with a 50 wt. % diethyl ether solution of methanesulfonic acid then immediately rinsed instead of soaking.

Examples 4–6

These examples describe the preparation of acrylic sheets having a smudge resistant nanocomposite hardcoat layer.

FOMBLIN Z-DEAL was individually applied as a 0.1 wt. % solution in HFE 7100 to the deprotected coated acrylic sheets of Examples 1–3 using a wire wound rod (#14, nominal wet film thickness=32 micron). The resulting treated samples were then placed in an oven at 60° C. for 12 hours. The result was three acrylic sheets coated with smudge resistant nanocomposite hardcoats (Examples 4, 5, and 6) prepared from Examples 1, 2, and 3 respectively. The results of physical tests on these examples are shown in Table 1.

TABLE 1

Performance Of Smudge Resistant Nanocomposite Hardcoats on Acrylic sheeting

| Example | Permanent Marker Pen Challenge Test | Dry Rub Durability Test |
|---|---|---|
| 4 | Ink Beading: P after 15 cycles<br>Ink Removal: P after 15 cycles | F after 25 cycles |
| 5 | Ink Beading: F after 9 cycles<br>Ink Removal: F after 9 cycles | P after 25 cycles<br>F after 50 cycles |
| 6 | Ink Beading: P after 15 cycles<br>Ink Removal: P after 15 cycles | P after 25 cycles<br>F after 50 cycles |

The smudge resistant hardcoat (i.e., fluorinated) surface of Example 6 was subjected to the chemical exposure test. Untreated acrylic sheeting was also tested as a control. Example 6 remained visually unchanged after the test, while untreated acrylic sheeting that had been exposed to acetone, coffee and ink showed visual signs of degradation (i.e., haze and/or stain).

Example 7

This example describes the preparation of an acrylic sheet having a deprotected nanocomposite hardcoat layer.

An acrylic sheet coated with nanocomposite hardcoat H2, prepared as above, was deprotected according to the procedure of Example 3.

Example 8

This example describes the preparation of an acrylic sheet having a smudge resistant nanocomposite hardcoat layer.

FOMBLIN Z-DEAL was applied to the deprotected coating of Example 7 according to the procedure of Example 4. Physical properties of the coated sheet are shown in Table 2.

Example 9

This example describes the preparation of an acrylic sheet having a deprotected nanocomposite hardcoat layer.

An acrylic sheet coated with nanocomposite hardcoat H3, prepared as above, was deprotected according to the procedure of Example 3.

Example 10

This example describes the preparation of an acrylic sheet having a smudge resistant nanocomposite hardcoat layer.

FOMBLIN Z-DEAL was applied to the deprotected coating of Example 9 according to the procedure of Example 4. Physical properties of the coated sheet are shown in Table 2.

Example 11

This example describes the preparation of an acrylic sheet having a deprotected nanocomposite hardcoat layer.

An acrylic sheet coated with nanocomposite hardcoat H4, prepared as above, was deprotected according to the procedure of Example 3.

Example 12

This example describes the preparation of an acrylic sheet having a smudge resistant nanocomposite hardcoat layer.

FOMBLIN Z-DEAL was applied to the deprotected coating of Example 11 according to the procedure of Example 4. Physical properties of the coated sheet are shown in Table 2.

Performance Testing of Examples 8, 10 and 12:

Permanent Marker Pen Challenge test results for Examples 8, 10, and 12 were: Example 8, P during first two ink removals; F to remove ink on the third challenge; Example 10, PB for ink removal during the second ink challenge; F ink removal during the third ink challenge; Example 12, PB for ink removal after 10 ink challenges.

TABLE 2

| | Dry Rub Durability Test Results | |
| --- | --- | --- |
| Example | No. of Dry Rubs | Ink Removability Test |
| 8 | 25 | PB |
| | 50 | PB |
| | 75 | F |
| 10 | 25 | P |
| | 50 | P |
| | 75 | PB |
| | 100 | F |
| 12 | 25 | P |
| | 50 | PB |
| | 75 | F |

Example 13

This example describes the preparation of a PET film having a deprotected nanocomposite hardcoat layer.

Nanocomposite hardcoat H5 coated PET film, prepared as described above, was soaked for 3 hours in a 10 wt. % aqueous solution of hydrochloric acid, rinsed with distilled water, and immediately treated with 8 wt. % aqueous potassium hydroxide for 1 minute. The coated sheet was thoroughly rinsed with distilled water and allowed to dry in air resulting in a deprotected nanocomposite hardcoat on PET film.

Example 14

This example describes the preparation of a PET film having a deprotected nanocomposite hardcoat layer.

A PET film coated with nanocomposite hardcoat H5, prepared as above, was deprotected according to the procedure of Example 2.

Example 15

This example describes the preparation of a PET film having a deprotected nanocomposite hardcoat layer.

A PET film coated with nanocomposite hardcoat H5, prepared as above, was deprotected according to the procedure of Example 3.

Examples 16–18

These examples describe the preparation of PC films having a deprotected nanocomposite hardcoat layer.

The procedures of Examples 13–15 were repeated using PC (having 0.076 mm thickness) as the film primary substrate instead of PET, resulting in Examples 16–18, respectively.

Example 16

This example describes the preparation of a PC film having a deprotected nanocomposite hardcoat layer.

A PC film coated with nanocomposite hardcoat H5, prepared as above, was deprotected according to the procedure of Example 13.

Example 17

This example describes the preparation of a PC film having a deprotected nanocomposite hardcoat layer.

A PC film coated with nanocomposite hardcoat H5, prepared as above, was deprotected according to the procedure of Example 2.

Example 18

This example describes the preparation of a PC film having a deprotected nanocomposite hardcoat layer.

A PC film coated with nanocomposite hardcoat H5, prepared as in Example 17, was deprotected by wiping the nanocomposite hardcoat, with a KIMWIPE wetted with anhydrous methanesulfonic acid, rinsing with distilled water, immediately treating the nanocomposite hardcoat surface with 8 wt. % aqueous potassium hydroxide (1 minute), thoroughly rinsing with distilled water and allowing the coated sheet to dry in air.

Example 19

This example describes the preparation of a TAC film having a deprotected nanocomposite hardcoat layer.

A TAC film coated with nanocomposite hardcoat H6, prepared as in Example 17, was deprotected by wiping the nanocomposite hardcoat, with a KIMWIPE wet with 38 wt. % hydrochloric acid, rinsing with distilled water, immediately treating the nanocomposite hardcoat surface with a KIMWIPE wet with 8 wt. % aqueous potassium hydroxide, thoroughly rinsing with distilled water and allowing the coated sheet to dry in air resulting in a deprotected nanocomposite hardcoat on TAC film.

Example 20

This example describes the preparation of a TAC film having a deprotected nanocomposite hardcoat layer.

The procedure of Example 18 was followed except that TAC film was used in place of PC film.

Examples 21–28

These examples describe the preparation of films having a smudge resistant nanocomposite hardcoat layer.

FOMBLIN Z-DEAL was applied to the films with deprotected nanocomposite hardcoat surfaces of Examples 13–20 as a 0.1 wt. % solution in HFE 7100 using a wire wound rod (#9, nominal wet film thickness=20.3 micron). The coated films were then placed in an oven at 60° C. for 12 hours to give Examples 21–28, respectively (e.g., Example 27 is derived from Example 19), as smudge resistant nanocomposite hardcoats coated on polymer film primary substrates. Physical properties of Examples 21–28 are shown in Table 3.

TABLE 3

Smudge and Abrasion Resistance of Examples 21–28

| Example | Dry Rub Durability Test | No. of Dry Rubs | Ink Beading Test | Ink Removability Test |
|---|---|---|---|---|
| 21 | P | 0 | P | P |
|  | P | 10 | F | F |
|  | P | 50 | F | F |
| 22 | P | 10 | P | P |
|  | P | 50 | P | P |
|  | P | 100 | F | PB |
|  | P | 250 | F | PB |
|  | P | 350 | F | F |
| 23 | P | 0 | PB | P |
|  | P | 10 | F | P |
|  | P | 20 | F | F |
| 24 | P | 0 | F | P |
|  | P | 10 | F | F |
|  | P | 50 | F | F |
| 25 | P | 0 | F | P |
|  | P | 10 | F | P |
|  | P | 20 | F | F |
| 26 | P | 0 | PB | P |
|  | P | 10 | F | P |
|  | P | 30 | F | P |
|  | P | 50 | F | F |
| 27 | P | 0 | PB | P |
|  | P | 20 | F | P |
|  | P | 50 | F | P |
|  | P | 90 | F | P |
|  | P | 150 | F | F |
| 28 | NM | 0 | PB | P |

Comparative Example A 3M 906 ABRASION RESISTANT COATING TRANSPARENT—50% SOLIDS was coated on 0.076 mm thick polycarbonate film using a wire wound rod (#5, nominal wet film thickness=11.3 micron). The coated film was then placed in a fume hood with 22.9 m/min air flow for 12 minutes to remove the 2-propanol by evaporation. The curing of the nanocomposite coating took place in the presence of nitrogen, at a translation speed of 12.2 m/min through an EPIQ irradiator, equipped with a "H" bulb, resulting in nanocomposite hardcoat H7 coated on the polymer film primary substrate.

Comparative Example B 3M 906 ABRASION RESISTANT COATING TRANSPARENT—50% SOLIDS was coated on 0.127 mm thick polvinylidene chloride primed polyethylene terephthalate film using a wire wound rod (#5, nominal wet film thickness=11.3 micron). The coated film was then placed in a fume hood with 22.9 m/min air flow for 12 minutes to remove the 2-propanol by evaporation. The curing of the nanocomposite coating took place in the presence of nitrogen, at a translation speed of 12.2 m/min through an EPIQ irradiator, equipped with a "H" bulb, resulting in nanocomposite hardcoat H7 coated on the polymer film primary substrate.

Comparative Examples C and D

The coated layer of COMPARATIVE EXAMPLES A and B was separately treated with a 0.1 wt. % solution of FOMBLIN Z-DEAL in HFE 7100 using a #9 wire wound rod (nominal film thickness 20.3 micron). The coated films were then placed in an oven at 60° C. for 12 hours to give COMPARATIVE EXAMPLES C and D, respectively.

Example 29

This example describes the preparation of a PC film having a deprotected nanocomposite hardcoat layer.

The procedure of Example 22 was followed except that PC film was used in place of PET film.

Example 30

This example describes the preparation of a PET film having a deprotected nanocomposite hardcoat layer.

The procedure of Example 27 was followed except that PET film was used in place of TAC film.

Example 31

This example describes the preparation of a PC film having a deprotected nanocomposite hardcoat layer.

The procedure of Example 27 was followed except that PC film was used film.

Examples 32–34

These examples describe the preparation of films having a smudge resistant hardcoat layer.

FOMBLIN Z-DEAL was applied to the films with deprotected nanocomposite hardcoat surfaces of Examples 29–31 as a 0.1 wt. % solution in HFE 7100 using a wire wound rod (#9, nominal wet film thickness=20.3 micron). The coated films were then placed in an oven at 60° C. for 12 hours to give Examples 32–34, respectively (e.g., Example 33 was derived from Example 30), as smudge resistant nanocomposite hardcoats coated on polymer film primary substrates.

Table 4 shows the results of physical testing of nanocomposite hardcoat films before and after rinsing with HFE-7100 solvent. Rinsing of the coated surface was accomplished using a squirt bottle filled with HFE-7100 solvent for approximately 30 seconds.

TABLE 4

Effect of Solvent Rinsing of Ink resistance

| Example | Ink Beading Test Before Rinsing | Ink Removability Test Before Rinsing | Ink Beading Test After Rinsing | Ink Removability Test After Rinsing |
|---------|------|------|------|------|
| COMPARATIVE EXAMPLE A | F | F | NM | NM |
| COMPARATIVE EXAMPLE B | F | F | NM | NM |
| COMPARATIVE EXAMPLE C | F | PB | F | F |
| COMPARATIVE EXAMPLE D | F | PB | F | F |
| 25 | F | PB | F | PB |
| 32 | PB | PB | F | PB |
| 33 | PB | P | PB | P |
| 34 | PB | P | PB | P |
| 25 | F* | PB* | F* | PB* |
| 21 | P* | P* | PB* | P* |
| 22 | PB* | P* | F* | P* |
| 23 | PB* | P* | F* | P* |
| 24 | F* | P* | F* | P* |
| 26 | F* | P* | F* | P* |
| 27 | PB* | P* | PB* | P* |
| 28 | PB* | P* | PB* | P* |

In Table 4, an "*" indicates that the result was obtained from a portion of coated film previously tested for ink resistance both before and after HFE-7100 rinsing before the test was performed.

Example 35

This example describes applying a PSA layer to the second major surface of a substrate bearing a smudge resistant hardcoat layer on its first major surface to make a composite article.

One release liner was removed from a 0.13 mm thick acrylic transfer PSA film having dual release liners (having the trade designation 3M 9843 Optically Clear Laminating Adhesive, available from Minnesota Mining and Manufacturing Company, St. Paul, Minn.) was applied to the uncoated surface (i.e., second major surface) of the PET polymer film of Example 33 using a laminating rubber roller.

Example 36

This example describes applying a PSA layer backed smudge resistant hardcoat treated film to a hand held electronic display device.

The remaining release liner of Example 35 was removed and the adhesive layer was applied to the front surface of a hand held display panel using a laminating rubber roller.

Example 37

This example describes applying a PSA layer to the second major surface of a substrate bearing a smudge resistant hardcoat layer on its first major surface to make a composite article.

One release liner was removed from 0.13 mm thick acrylic transfer PSA film having dual release liners (having the trade designation 3M 9483 Optically Clear Laminating Adhesive) was applied to the uncoated surface (i.e., second major surface) of the PET polymer film of Example 33 using a laminating rubber roller.

Example 38

This example describes the preparation of a stack of PSA backed smudge resistant hardcoat bearing films.

Four identically shaped sheets were cut from the material prepared in Example 37. The remaining release liner of the first sheet was removed and the adhesive layer was applied to the smudge resistant front surface of the second sheet. The remaining release liner of the second sheet was removed and the adhesive layer was applied to the smudge resistant front surface of the third sheet. The remaining release liner of the third sheet was removed and the adhesive layer was applied to the smudge resistant front surface of the fourth sheet.

What is claimed is:

1. A method for preparing a smudge and abrasion resistant article comprising the steps of:
   a) contacting a plurality of nanoparticles with a latent coupling agent to form latent reactive nanoparticles;
   b) intimately mixing the latent reactive nanoparticles with a binder precursor;
   c) curing the binder precursor to form a nanocomposite having an exposed first surface comprising latent reactive nanoparticles;
   d) deprotecting a plurality of latent reactive nanoparticles to form reactive nanoparticles at the first surface of the nanocomposite; and
   e) contacting a reactive fluorochemical with the first surface of the nanocomposite such that fluorinated organic groups are covalently bonded to a plurality of the reactive nanoparticles present at the first surface of the nanocomposite.

2. The method of claim 1, wherein the latent coupling agent is a latent amine coupling agent.

3. The method of claim 2, wherein the latent amine coupling agent is a carbamate.

4. The method of claim 3, wherein the latent amine coupling agent is an organosilicon carbamate.

5. The method of claim 4, wherein the latent amine coupling agent is (tert-butylcarbamatopropyl)triethoxysilane.

6. The method of claim 1, wherein the reactive fluorochemical has perfluoropoly(alkyleneoxy) segments therein.

7. The method of claim 6, wherein the reactive fluorochemical is a perfluoropolyether mono- or di-ester.

8. The method of claim 6, wherein the reactive fluorochemical is a perfluoropolyether diester.

9. The method of claim 1, wherein deprotecting is accomplished by heating.

10. The method of claim 1, wherein deprotecting is accomplished by treatment with a catalyst.

11. The method of claim 1, wherein the nanoparticles comprise an oxide selected from the group consisting of oxides of aluminum, oxides of silicon, and mixed oxides of aluminum and silicon.

12. The method of claim 11, wherein the nanoparticles comprise an oxide of silicon.

13. The method of claim 1, wherein the nanoparticles have a particle size of less than 100 nm.

14. The method of claim 1, wherein the binder precursor is free-radically polymerizable.

15. The method of claim 14, wherein the binder precursor comprises at least one of a monomer and an oligomer selected from the group consisting of acrylates and methacrylates.

16. The method of claim 13, further comprising a photoinitiator.

17. The method of claim 1, further comprising coating the binder precursor on a first major surface of a primary substrate.

18. The method of claim 17, wherein the latent coupling agent is a latent amine coupling agent.

19. The method of claim 18, wherein the latent amine coupling agent is a carbamate.

20. The method of claim 19, wherein the latent amine coupling agent is an organosilicon carbamate.

21. The method of claim 20, wherein the latent amine coupling agent is (tert-butylcarbamatopropyl)triethoxysilane.

22. The method of claim 17, wherein the reactive fluorochemical has perfluoropoly(alkyleneoxy) segments therein.

23. The method of claim 22, wherein the reactive fluorochemical is a perfluoropolyether mono- or di-ester.

24. The method of claim 23, wherein the reactive fluorochemical is a perfluoropolyether diester.

25. The method of claim 17, wherein deprotecting is accomplished by heating.

26. The method of claim 25, wherein deprotecting is accomplished by treatment with a catalyst.

27. The method of claim 17, wherein the nanoparticles comprise an oxide selected from the group consisting of oxides of aluminum, oxides of silicon, and mixed oxides of aluminum and silicon.

28. The method of claim 27, wherein the nanoparticles comprise an oxide of silicon.

29. The method of claim 28, wherein the nanoparticles have a particle size of less than 100 nm.

30. The method of claim 29, wherein the binder precursor is free-radically polymerizable.

31. The method of claim 30, wherein the binder precursor comprises at least one of a monomer and an oligomer selected from the group consisting of acrylates and methacrylates.

32. The method of claim 30, further comprising a photoinitiator.

33. A smudge and abrasion resistant article prepared by the method of claim 1.

34. A smudge and abrasion resistant article prepared by the method of claim 17.

35. The article of claim 34, wherein the nanocomposite forms a layer having a thickness of from about 0.5 microns up to about 10 microns.

36. The article of claim 35, wherein the nanocomposite layer has a thickness of from about 3 microns up to about 6 microns.

37. The article of claim 34, wherein the article is antireflective.

38. The article of claim 34, wherein the primary substrate is selected from the groups consisting of glass, quartz, wood, metal, painted metals, acrylic polymers, polycarbonates, and polyesters.

39. The article of claim 37, wherein the primary substrate is an optical element.

40. The article of claim 39, wherein the primary substrate is s elected from the group consisting of an eyeglass lens, a camera lens, a binocular lens, a telescope lens, a mirror, a fresnel lens, a compact disc, a DVD disc, a hologram, a window, a cellular phone, a personal data assistant, a calculator, a television, electronic paper, a computer privacy filter, and a computer touch screen.

41. The article of claim 40, wherein the primary substrate is a mirror.

42. The article of claim 37, wherein the primary substrate is a motor vehicle.

43. The article of claim 34, wherein the primary substrate further comprises a second major surface which intimately contacts an adhesive layer.

44. The article of claim 43, wherein the primary substrate is flexible.

45. The article of claim 44, wherein the primary substrate is a thermoplastic material.

46. The article of claim 45, wherein the adhesive layer comprises a pressure-sensitive adhesive.

47. The article of claim 46, wherein the adhesive layer intimately contacts a release liner.

48. The article of claim 46, wherein the composite article is in the form of a stack.

49. The article of claim 43, wherein the adhesive layer intimately contacts a secondary substrate.

50. The article of claim 49, wherein the secondary substrate comprises a mirror, a fresnel lens, a compact disc, a DVD disc, a hologram, a window, or an electronic display device.

51. The article of claim 50, wherein the electronic display device is selected from the group consisting of a cellular phone, a personal data assistant, a calculator, a television, electronic paper, a computer privacy filter, a global positioning system, and a computer touch screen.

52. The article of claim 51, wherein the electronic display device is a cellular phone or a personal data assistant.

53. The article of claim 49, wherein the secondary substrate is a graphic article.

54. The article of claim 53, wherein the graphic article is a traffic sign.

55. The article of claim 49, wherein the secondary substrate is a motor vehicle.

56. A nanocomposite article having a first major surface and an interior portion comprising a binder and nanoparticles wherein the first major surface comprises nanoparticles having covalently bonded fluorinated organic groups, and wherein the interior portion comprises latent reactive nanoparticles.

57. The article of claim 56, wherein the latent reactive nanoparticles comprise organic protecting groups wherein the organic protecting groups are removable by heating under conditions wherein the binder does not decompose.

58. The article of claim 56, wherein the latent reactive nanoparticles comprise organic protecting groups wherein the organic protecting groups are removable by acid or base catalyzed hydrolysis under conditions wherein the binder does not decompose.

59. The article of claim 56, wherein the interior portion is substantially free of nanoparticles having covalently bonded fluorinated organic groups.

60. The article of claim 56, wherein the organic protecting group generates an amine upon deprotection.

61. The article of claim 60, wherein the organic protecting group comprises a t-butylcarbamato group.

62. The article of claim 56, wherein the covalently bonded fluorinated organic groups are covalently bonded to more than one nanoparticle.

63. A nanocomposite article having a first major surface and an interior portion comprising a binder and nanoparticles wherein the first major surface comprises reactive nanoparticles, and wherein the interior portion comprises latent reactive nanoparticles.

64. The article of claim 63, wherein the interior portion is substantially free of nanoparticles having covalently bonded fluorinated organic groups.

65. The article of claim 63, wherein the reactive particles comprise at least one amino group.

66. The article of claim 63, wherein the latent reactive nanoparticles comprise at least one t-butoxycarbonyl group.

67. The article of claim 63, wherein the nanoparticles having covalently bonded reactive organic groups have no free-radically polymerizable groups.

* * * * *

UNITED STATES PATENT AND TRADEMARK OFFICE
CERTIFICATE OF CORRECTION

PATENT NO. : 7,101,616 B2  
APPLICATION NO. : 10/236737  
DATED : September 5, 2006  
INVENTOR(S) : David S. Arney It is certified that error appears in the above-identified patent and that said Letters Patent is hereby corrected as shown below:

On Title page item 56  
Page 2  
Column 2, (Foreign Patent Documents), Line 6, below "WO99/37720 * 7/1999" delete "WO 99/33720".

Column 15  
Line 46, delete "COMPOSITONS" and insert -- COMPOSITIONS -- in place thereof.

Column 16  
Line 49, delete "(6.1 n/min)" and insert -- (6.1 m/min) -- in place thereof.

Column 17  
Line 42, delete "polvinylidene" and insert -- polyvinylidene -- in place thereof.

Column 22  
Line 44, delete "polvinylidene" and insert -- polyvinylidene -- in place thereof.

Column 23  
Line 17, insert -- in place of TAC -- following "used".  
Line 23, insert -- nanocomposite -- following "resistant".

Column 26  
Line 28, Claim 40, delete "s elected" and insert -- selected -- in place thereof.

Signed and Sealed this

Ninth Day of January, 2007

JON W. DUDAS  
*Director of the United States Patent and Trademark Office*